United States Patent Office 3,301,885
Patented Jan. 31, 1967

3,301,885
PHENYL N-HYDROCARBOXY N-HYDROCARBYL
THIOCARBAMATES
Sidney B. Richter, Chicago, and Frank Ross, Villa Park, Ill., assignors to Velsicol Chemical Corporation, Chicago, Ill., a corporation of Illinois
No Drawing. Filed Apr. 13, 1964, Ser. No. 359,432
21 Claims. (Cl. 260—455)

This invention relates to the production of new pesticidal compositions of matter. More specifically, this invention relates to new chemical compounds of the general formula

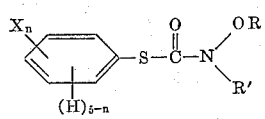

wherein R and R' are independently selected from the group consisting of lower alkyl, alkenyl, haloalkyl, and nitroalkyl; X is selected from the group consisting of halogen, methyl and nitro radicals; $n$ is an integer from 0 to 2. For commercial application of the present invention, R and R' each contain up to 10 carbon atoms; it is preferred that R and R' each contain from 1 to 4 carbon atoms. The new compounds of this invention are useful as herbicides, miticides and insecticides.

The new compounds of this invention can be readily prepared, for example, in a two-step synthesis comprising reacting a suitable mercaptan with phosgene and then reacting the reaction product from step 1 with a suitable amine.

Suitable mercaptan starting materials are either commercially available or can be prepared by methods known to the art such as reduction of a suitable sulfonic acid chloride (Gilman, H. and Blatt, A. H., "Organic Synthesis," New York, Wiley and Sons, Inc., Coll. vol. I, p. 504) or diazotization of a suitable amine followed by reaction with potassium xanthate (Horning, E. C., "Organic Synthesis," New York, Wiley and Sons, Inc., Coll. vol. 3, p. 809).

Some typical mercaptans which can be used as reactants in preparing the new compounds of the present invention are p-chlorothiophenol,
p-bromothiophenol,
p-methylthiophenol,
p-nitrothiophenol,
p-(methylthio)thiophenol,
p-methoxythiophenol,
o-chlorothiophenol,
o-bromothiophenol,
o-methylthiophenol,
o-nitrothiophenol,
o-(methylthio)thiophenol,
o-methoxythiophenol,
m-chlorothiophenol,
m-bromothiophenol,
m-methylthiophenol,
m-nitrothiophenol,
m-(methylthio)thiophenol, and
m-methoxythiophenol,
2,4-dichlorothiophenol,
2,5-dichlorothiophenol,
3,4-dichlorothiophenol,
2,4-dimethylthiophenol,
2,5-dimethylthiophenol.

Suitable amines for the second step of the synthesis are the formula HN(OR) (R') wherein (OR) and (R') are as defined above. These amines are commercially available or can be prepared by methods known to the art such as the preparation illustrated in Major and Fleck, J. A. C. S., vol. 50, pp. 1479–80. Some typical amines which can be employed are N-methoxy-N-methylamine, N-ethoxy-N-allylamine, N-ethoxy-N-ethylamine, N-isopropoxy-N-isopropylamine, N - pentoxy-N-pentylamine, N-hexoxy-N-hexylamine, N-heptoxy-N-heptylamine, N-octoxy-N-octylamine, N-nonoxy-N-nonylamine, N-decoxy-N-decylamine, and the like.

The first step in the preparation of the compounds of this invention comprises the formation of a chloroformate by the reaction of a mercaptan with an excess of phosgene dissolved in toluene, at least 1 mole of phosgene should be used for each mole of mercaptan. N,N-dimethylaniline is present in the reaction mixture in order to neutralize the hydrogen chloride which is produced in the reaction. The exact reaction temperatures are not critical. The reaction begins at about normal room temperature but since the reaction is exothermic the mixture must be cooled. The process is completed in less than about two hours and the chloroformate can be recovered readily by techniques known to the art such as extraction of impurities with cold dilute hydrochloric acid and then evaporation.

In the second step, the product of the first step is reacted with about an equimolar quantity of the free amine in ether in the presence of anhydrous potassium carbonate. The reaction is accomplished at room temperature, though the exact temperature is again not critical. The hydrogen chloride which is produced in this reaction is neutralized with the potassium carbonate which is present in excess (i.e., about 2 molecular equivalents of potassium carbonate per mole of amine). The reaction is completed in less than about four hours and the product can be isolated from the reaction mixture by filtration of the ether solution and then evaporation or distillation, or other techniques known to the art. The product can then be purified by recrystallization from a suitable solvent such as heptane, pentane or benzene, or fractional distillation or some other method known to the art.

The manner in which typical new compounds of this invention can be prepared is illustrated in the following examples. All temperatures are in degrees centigrade. All pressures in mm. of Hg.

EXAMPLE 1

*Preparation of p-chlorophenyl chlorothioformate*

Phosgene (34.3 g.) gas was passed through 100.0 ml. of toluene at room temperature in a 500 ml. 3-necked round bottom flask with an outlet tube leading to concentrated ammonia to absorb excess phosgene. The flask was then cooled in ice water and fitted with a stirrer and dropping funnel.

To the mixture, solid p-chlorothiolphenol (43.0 g.) was added gradually with stirring. When this was completed N,N-dimethylaniline (40.0 g.) was added dropwise with stirring. The stirring and cooling of the mixture was continued for 2 hrs. subsequent to the completion of these additions. Then, the toluene solution was extracted with cold dilute hydrochloric acid, washed with cold water, and dried with calcium chloride. The calcium chloride was filtered off and washed with benzene. The filtrate and the washings were combined and evaporated under aspirator pressure. The residue was vacuum distilled at reduced pressure to give 57.2 g. of yellow p-chlorophenyl chlorothiolformate which turned green on standing at room tempearture, B.P. 81°–92°/0.8 mm.

EXAMPLE 2

*Preparation of p-chlorophenyl N-methoxy-N-methylthiocarbamate*

A suspension of N-methyl-N-methoxyamine hydrochloride (9.7 g.) and anhydrous potassium carbonate (15.0 g.) in ether (100.0 ml.) and a small amount of water was placed in a 500 ml. 3-necked, round bottom flask equipped with a stirrer, reflux condenser, and dropping funnel. A solution of p-chlorophenyl chlorothiolformate (21.0 g.) in ether (100.0 ml.) was added dropwise with stirring. The mixture was stirred for 4 hrs. at room temperature. The ether solution was then filtered and evaporated at room temperature under an air-jet to give 24.5 of a white solid, M.P. 65°–68°. The product was then recrystallized from benzene-heptane, and the crystals were separated on a Buchner funnel and air dried. The product was again recrystallized from benzene-heptane to give 8.2 g. of p-chlorophenyl N-methoxy-N-methylthiocarbamate, M.P. 76–77°.

A wide variety of other new compounds within the scope of this invention can be prepared in a manner similar to that detailed above. Given in the following examples are the reactants which can be used to prepare the indicated named compounds of this invention. The compound N-methoxy-N-methylamine is designated Compound A for brevity.

EXAMPLE 3 p-Bromophenyl chlorothiolformate+Compound A=p-bromoyphenyl N-methoxy-N-methylthiolcarbamate, white solid, M.P. 80–1° (from heptane).

Analysis for $C_9H_{10}O_2NBrS$: Theory percent: C, 39.14; H, 3.65; Br, 28.94; N, 5.07; S, 11.61. Found percent: C, 39.36; H, 4.12; Br, 29.38; N, 5.11; S, 11.78.

EXAMPLE 4 p-Methylphenyl chlorothiolformate+Compound A=p-methylphenyl N-methoxy-N-methylthiolcarbamate, white solid, M.P. 69.5–70.5° (from heptane).

Analysis for $C_{10}H_{13}O_2NS$: Theory, percent: C, 56.85; H, 6.20; N, 6.63; S, 15.18. Found, percent: C, 56.72; H, 6.39; N, 6.75; S, 15.53.

EXAMPLE 5 o-Methylphenyl chlorothiolformate+Compound A=o-methylphenyl N-methoxy-N-methylthiolcarbamate, colorless liquid, B.P. 117–22°/0.8 mm.

Analysis for $C_{10}H_{13}O_2NS$: Theory, percent: C, 56.85; H, 6.20; N, 6.63; S, 15.18. Found, percent: C, 57.38; H, 6.64; N, 7.81; S, 14.75.

EXAMPLE 6 m-Methylphenyl chlorothiolformate+Compound A=m-methylphenyl N-methoxy-N-methylthiolcarbamate, white solid, M.P. 34–5° (from heptane).

Analysis for $C_{10}H_{13}O_2NS$: Theory, percent: C, 56.85; H, 6.20; N, 6.63; S, 15.18. Found, percent: C, 56.45; H, 6.19; N, 4.99; S, 15.98.

EXAMPLE 7 p-Nitrophenyl chlorothiolformate+Compound A=p-nitrophenyl-N-methoxy-N-methylthiolcarbamate, yellow solid, M.P. 104–7° (from benzene-heptane).

Analysis for $C_9H_{10}O_4N_2S$: Theory, percent: C, 44.81; H, 3.76; N, 11.53; S, 13.29. Found, percent: C, 44.58; H, 4.90; N, 11.78; S, 13.40.

EXAMPLE 8 p-Thiomethylphenyl chlorothiolformate+Compound A=p-thiomethylphenyl N-methoxy-N-methylthiolcarbamate, white solid, 53.5–4.5° (from heptane).

Analysis for $C_{10}H_{13}O_2NS_2$: Theory, percent: C, 49.36; H, 5.38; N, 5.76; S, 26.35. Found, percent: C, 49.52; H, 5.65; N, 5.87; S, 26.43.

EXAMPLE 9 p-Methoxyphenyl chlorothiolformate+Compound A=p-methoxyphenyl N-methoxy-N-methylthiolcarbamate, white solid, 73–4.5° (from heptane).

Analysis for $C_{10}H_{13}O_3NS$: Theory, percent: C, 52.84; H, 5.77; N, 6.06; S, 14.11. Found, percent: C, 52.60; H, 5.89; N, 6.28; S, 14.24.

EXAMPLE 10 p-Chlorophenyl chlorothiolformate+N-ethoxy-N-allylamine=p-chlorophenyl N-ethoxy-N-allylthiolcarbamate, colorless liquid, B.P. 144°/0.06 mm.

Analysis for $C_{10}H_{13}O_3NS$: Theory, percent: C, 52.84; H, 5.77; N, 6.16; S, 14.11. Found, percent: C, 52.60; H, 5.89; N, 6.28; S, 14.24.

EXAMPLE 11 p-Chlorophenyl chlorothiolformate+N-ethoxy-N-ethylamine=p-chlorophenyl N-ethoxy-N-ethylthiolcarbamate, colorless liquid, B.P. 127–37°/0.05 mm.

Analysis for $C_{11}H_{14}O_2NClS$: Theory, percent: C, 50.86; H, 5.43; Cl, 13.65; N, 5.39; S, 12.34. Found, percent: C, 50.59; H, 5.58; Cl, 13.71; N, 5.39; S, 12.31.

EXAMPLE 12 p-Chlorophenyl chlorothiolformate+N-isopropoxy-N-isopropylamine=p-chlorophenyl N-isopropoxy-N-isopropylthiolcarbamate, white solid, M.P. 34–5° (from pentane).

Analysis for $C_{13}H_{18}O_2NClS$: Theory, percent: C, 54.25; H, 6.30; Cl, 12.32; N, 4.87. Found, percent: C, 54.18; H, 6.34; Cl, 12.69; N, 4.86.

EXAMPLE 13 p-Bromophenyl chlorothiolformate+N-ethoxy-N-ethylamine=p-bromophenyl N-ethoxy-N-ethylthiolcarbamate, clear liquid, B.P. 142–6°/0.06 mm.

Analysis for $C_{11}H_{14}O_2NBrS$: Theory, percent: C, 43.43; H, 4.64; Br, 26.27; N, 4.60; S, 10.54. Found, percent: C, 43.49; H, 4.80; Br, 26.22; N, 4.66; S, 10.42.

EXAMPLE 14 p-Fluorophenyl chlorothiolformate+Compound A=p-fluorophenyl N-methoxy-N-methylthiolcarbamate, white solid, M.P. 55–60° (from heptane).

Analysis for $C_9H_{10}FO_2NS$: Theory, percent: N, 6.51; S, 14.90. Found, percent: N, 6.51; S, 14.99.

EXAMPLE 15

2,5-dichlorophenyl chlorothiolformate+Compound A=2,5-dichlorophenyl N-methoxy-N-methlthiocarbamate, clear liquid, B.P. 89–90°/0.08 mm.

Analysis for $C_9H_9Cl_2O_2NS$: Theory, percent: C, 34.81; H, 1.25; Cl, 44.04; S, 13.28. Found, percent: C, 35.19; H, 0.92; Cl, 43.46; S, 13.26.

EXAMPLE 16

2,5-dimethylphenyl chlorothiolformate+Compound A=2,5-dimethylphenyl N-methoxy-N-methylthiolcarbamate, clear liquid, B.P. 109–112°/0.07 mm.

Analysis for $C_{11}H_{15}O_2NS$: Theory, percent: C, 58.64; H, 6.71; N, 6.22; S, 14.23. Found, percent: C, 58.82; H, 7.10; N, 6.25; S, 14.21.

EXAMPLE 17

3,4 - dichlorophenyl chlorothiolformate+Compound A=3,4-dichlorophenyl N-methoxy-N - methylthiolcarbamate, white solid, M.P. 121–121.5° (from acetone).

Analysis for $C_9H_9Cl_2O_2NS$: Theory, percent: C, 40.61; H, 3.41; Cl, 26.64; N, 5.26; S, 12.05. Found, percent: C, 40.84; H, 3.56; Cl, 26.37; N, 5.22; S, 11.92.

EXAMPLE 18

2,4 - dimethylphenyl chlorothiolformate+Compound A=2,4-dimethylphenyl N-methoxy-N - methylthiolcarbamate, clear liquid, B.P. 119–123°/0.08 mm.

Analysis for $C_{11}H_{15}O_2NS$: Theory, percent: C, 58.64; H, 6.71; N, 6.22; S, 14.23. Found, percent: C, 58.49; H, 6.68; N, 6.18; S, 14.00.

EXAMPLE 19

2,4 - dichlorophenyl chlorothiolformate+Compound A=2,4-dichlorophenyl N-methoxy-N - methylthiolcarbamate, white solid, M.P. 76.5–7° (from heptane).

Analysis for $C_9H_9Cl_2O_2NS$: Theory, percent: C, 40.61; 3.41; Cl, 26.64; N, 5.06; S, 12.05. Found, percent: C, 40.67; H, 3.76; Cl, 26.44; N, 4.88; S, 11.79.

Other examples of possible products are p-chlorophenyl N-pentoxy-N-pentylthiolcarbamate,
p-bromophenyl N-pentoxy-N-pentylthiolcarbamate,
p-chlorophenyl N-hexoxy-N-hexylthiolcarbamate,
p-bromophenyl N-hexoxy-N-hexylthiolcarbamate,
p-chlorophenyl N-heptoxy-N-heptylthiolcarbamate,
p-bromophenyl N-heptoxy-N-heptylthiolcarbamate,
p-chlorophenyl N-octoxy-N-octylthiolcarbamate,
p-bromophenyl N-octoxy-N-octylthiolcarbamate,
p-chlorophenyl N-nonoxy-N-nonylthiolcarbamate,
p-bromophenyl N-nonoxy-N-nonylthiolcarbamate,
p-chlorophenyl N-decoxy-N-decylthiolcarbamate,
p-bromophenyl N-decoxy-N-decylthiolcarbamate, and the like.

For practical use as pesticides, the compounds of this invention are generally incorporated into herbicidal, insecticidal, and miticidal, compositions which comprise an inert carrier and a pesticidally toxic amount of such a compound. Such compositions, which are usually known in the art as formulations, enable the active compound to be applied conveniently to the site of the pest infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the pest infestation. The emulsifiers most commonly used in these concentrates are nonionic or mixtures of nonionic with anionic surface-active agents.

A typical composition according to this invention is illustrated by the following example, in which the quantities are in parts by weight.

EXAMPLE 20

*Preparation of a dust*

Product of Example 2 _____ 10
Powdered talc _____ 90

The above ingredients are mixed in a mechanical grinder-blender and are ground until a homogeneous, free-flowing dust of the desired particle size is obtained. This dust is suitable for direct application to the site of the pest infestation.

The pesticides of this invention can be applied in any manner recognized by the art. The concentration of the new compounds of this invention in the compositions will vary greatly with the type of formulation and the purpose for which it is designed, but generally the compositions will comprise from about 0.05 to about 95 percent by weight of the active compounds of this invention. In a preferred embodiment of this invention, the compositions will comprise from about 5 to about 75 percent by weight of the active compound. The compositions can also comprise such additional substances as other pesticides, spreaders, adhesives, stickers, fertilizers, activators, synergists, and the like.

The new compounds of this invention can be used in many ways for the control of insects and mites. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean beetle, the southern armyworm, cabbageworms, grasshoppers, the Colorado potato beetle, the cankerworm, and the gypsy worm. There are also piercing-sucking insects, such as the pea aphid, the house fly, the chinch bug, leafhoppers, and plant bugs.

Another group of insects comprises the internal feeders. These include borers such as the European corn borer and the corn earworm; worms or weevils such as the codling moth, cotton boll weevil, plum curculio, melonworm, and the apple maggot; leaf miners such as the apple leaf miner and the beet leaf miner; and gall insects such as the wheat jointworm and grape phylloxera. Insects which attack below the surface of the ground are classified as subterranean insects and include such destructive pests as the wooly apple aphid, the Japanese beetle, and the corn rootworm.

Mites and ticks are not true insects. Many economically important species of mites and ticks are known, including the red spider mite, the strawberry spider mite, the cattle tick, and the poultry mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding while a pound or more of active compound per acre may be required for the control of a heavy infestation of insects under conditions favorable to their development.

Weeds are undesirable plants in their growing where they are not wanted, having no economic value, and interfering with the production of cultivated crops or with the welfare of livestock. Many types of weeds are known, including annuals such as pigweed, lambsquarters, yellow foxtail, crabgrass, wild mustard, French-weed, rye-grass, goose-grass, chickweed, and smartweed; biennials such as wild carrot, great burdock, mullein, round-leaved mallow, blue thistle, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, field chickweed, and winter-cress. Similarly, such weeds can be classified as broad-leaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The herbicidal toxicity of the new compounds of this invention can be illustrated by many of the established techniques known to the art. For example, emulsifiable concentrate compositions can be diluted with water to concentrations equivalent to 4 pounds of the active compound per acre. Duplicate paper pots filled with a sand and soil mixture are seeded with weeds; and immediately after seeding, the soil surface of each pot is sprayed with an appropriately diluted test solution. The weed growth is maintained under artificial lighting with irrigation provided by placing the porous pots in a small amount of water in stainless steel trays. The weeds are observed for a week to ten days; and the percent kill, injury, and stand reduction are recorded. The results indicate a high order of herbicidal activity of the compounds of this invention. Comparable pre-planting or post-emergence tests can also be used.

The toxicity of the compounds in this invention to weeds can be demonstrated by a variety of testing techniques known to the art. In one series of experiments, tests compounds formulated as aqueous emulsions were sprayed at various dosages on the surface of soil which had been seeded less than twenty-four hours earlier with seeds of crop plants and weeds. After spraying, the soil containers were placed in the greenhouse and provided with supplementary light and heat as required and daily or more frequent watering. The type and severity of injury to each crop and weed was determined 15 to 20 days after the soil treatments. The severity of injury was rated on a 0 to 10 scale as follows: 0=no injury; 1, 2=slight injury; 3, 4=moderate injury; 5, 6= moderately severe injury; 7, 8, 9=severe injury; 10= death. Some of the results of these tests are presented in the following tables: Tables I–V show the high toxicity of the compounds of the present invention to weeds, while Tables VI–IX show the minimal toxicity that these compounds exhibit when in contact with beneficial crops.

This high degree of selectivity is of great value in the application of these compounds as herbicides.

TABLE I.—BARNYARD GRASS

| Test Chemical | Concn.[1] | Injury Rating |
|---|---|---|
| p-Chlorophenyl N-methoxy-N-methylthiolcarbamate | 2 | 9 |
|  | 8 | 9 |
| p-Bromophenyl N-methoxy-N-methylthiolcarbamate | 2 | 9 |
|  | 8 | 9 |
| p-Methylphenyl N-methoxy-N-methylthiocarbamate | 8 | 9 |
| p-Chlorophenyl N-ethoxy-N-ethylthiolcarbamate | 8 | 9 |
| p-Bromophenyl N-ethoxy-N-ethylthiolcarbamate | 8 | 9 |
| p-Methoxyphenyl N-methoxy-N-methylthiolcarbamate | 8 | 10 |
| p-Nitrophenyl N-methoxy-N-methylthiolcarbamate | 8 | 8 |
| 3,4-dichlorophenyl N-methoxy-N-methylthiolcarbamate | 8 | 9 |
| 2,4-dichlorophenyl N-methoxy-N-methylthiolcarbamate | 2 | 9 |
|  | 8 | 9 |
| 2,4-dimethylphenyl N-methoxy-N-methylthiolcarbamate | 8 | 9 |

[1] Lbs. actual test chemical per acre.

TABLE II.—CRABGRASS

| Test Chemical | Concn. | Injury Rating |
|---|---|---|
| p-Chlorophenyl N-methoxy-N-methylthiolcarbamate | 2 | 8 |
|  | 8 | 9 |
| p-Bromophenyl N-methoxy-N-methylthiolcarbamate | 2 | 9 |
|  | 8 | 9 |
| p-Chlorophenyl N-ethoxy-N-allylthiolcarbamate | 8 | 8 |
| o-Methylphenyl N-methoxy-N-methylthiolcarbamate | 8 | 8 |
| p-Chlorophenyl N-ethoxy-N-ethylthiolcarbamate | 8 | 9 |
| p-Bromophenyl N-ethoxy-N-ethylthiolcarbamate | 8 | 9 |
| p-Methylthiophenyl N-methoxy-N-methylthiolcarbamate | 6 | 9 |
| p-Methoxyphenyl N-methoxy-N-methylthiolcarbamate | 8 | 8 |
| 2,4-dimethylphenyl N-methoxy-N-methylthiolcarbamate | 8 | 9 |
| 2,4-dichlorophenyl N-methoxy-N-methylthiolcarbamate | 2 | 9 |
|  | 8 | 9 |

TABLE III.—DOWNY BROME

| Test Chemical | Concn. | Injury Rating |
|---|---|---|
| p-Chlorophenyl N-methoxy-N-methylthiolcarbamate | 8 | 10 |
| p-Bromophenyl N-methoxy-N-methylthiolcarbamate | 2 | 10 |
|  | 8 | 9 |
| p-Nitrophenyl N-methoxy-N-methylthiolcarbamate | 8 | 10 |
| 2,4-dichlorophenyl N-methoxy-N-methylthiolcarbamate | 8 | 9 |

TABLE IV.—FOXTAIL

| Test Chemical | Concn. | Injury Rating |
|---|---|---|
| p-Chlorophenyl N-methoxy-N-methylthiolcarbamate | 8 | 9 |
| p-Bromophenyl N-methoxy-N-methylthiolcarbamate | 2 | 10 |
|  | 8 | 9 |
| p-Chlorophenyl N-ethoxy-N-ethylthiolcarbamate | 8 | 9 |
| p-Bromophenyl N-ethoxy-N-ethylthiolcarbamate | 8 | 8 |
| p-Methylthiophenyl N-methoxy-N-methylthiolcarbamate | 6 | 7 |
| 3,4-dichlorophenyl N-methoxy-N-methylthiolcarbamate | 8 | 8 |
| 2,4-dimethylphenyl N-methoxy-N-methylthiolcarbamate | 8 | 8 |
| 2,4-dichlorophenyl N-methoxy-N-methylthiolcarbamate | 2 | 9 |
|  | 8 | 9 |

TABLE V.—RYEGRASS

| Test Chemical | Concn. | Injury Rating |
|---|---|---|
| p-Chlorophenyl N-methoxy-N-methylthiolcarbamate | 8 | 9 |
| p-Bromophenyl N-methoxy-N-methylthiolcarbamate | 2 | 9 |
|  | 8 | 9 |
| p-Chlorophenyl N-ethoxy-N-ethylthiolcarbamate | 8 | 8 |
| p-Bromophenyl N-ethoxy-N-ethylthiolocarbamate | 8 | 8 |
| p-Nitrophenyl N-methoxy-N-methylthiolcarbamate | 2 | 8 |
|  | 8 | 10 |
| 2,4-dimethylphenyl N-methoxy-N-methylthiolcarbamate | 8 | 9 |
| 2,4-dichlorophenyl N-methoxy-N-methylthiolcarbamate | 8 | 9 |

TABLE VI.—CORN

| Test Chemical | Concn. | Injury Rating |
|---|---|---|
| p-Chlorophenyl N-methoxy-N-methylthiolcarbamate | 2 | 0 |
|  | 8 | 1 |
| p-Bromophenyl N-methoxy-N-methylthiolcarbamate | 2 | 0 |
|  | 8 | 0 |
| p-Methylphenyl N-methoxy-N-methylthiolcarbamate | 2 | 0 |
|  | 8 | 0 |
| o-Methylphenyl N-methoxy-N-methylthiolcarbamate | 2 | 0 |
|  | 8 | 0 |
| p-Chlorophenyl N-ethoxy-N-allylthiolcarbamate | 2 | 0 |
|  | 8 | 0 |
| 2,5-dimethylphenyl N-methoxy-N-methylthiolcarbamate | 2 | 0 |
|  | 8 | 0 |
| 2,4-dimethylphenyl N-methoxy-N-methylthiolcarbamate | 8 | 0 |
| 2,4-dichlorophenyl N-methoxy-N-methylthiolcarbamate | 2 | 0 |

TABLE VII.—COTTON

| Test Chemical | Concn. | Injury Rating |
|---|---|---|
| p-Chlorophenyl N-methoxy-N-methylthiolcarbamate | 2 | 1 |
|  | 8 | 2 |
| p-Bromophenyl N-methoxy-N-methylthiolcarbamate | 2 | 0 |
|  | 8 | 0 |
| o-Methylphenyl N-methoxy-N-methylthiolcarbamate | 2 | 0 |
|  | 8 | 0 |
| p-Chlorophenyl N-ethoxy-N-ethylthiolcarbamate | 2 | 0 |
|  | 8 | 0 |
| p-Bromophenyl N-ethoxy-N-ethylthiolcarbamate | 2 | 0 |
|  | 8 | 0 |
| p-Nitrophenyl N-methoxy-N-methylthiolcarbamate | 2 | 0 |
|  | 8 | 0 |
| 3,4-dichlorophenyl N-methoxy-N-methylthiolcarbamate | 2 | 0 |
|  | 8 | 0 |
| 2,4-dichlorophenyl N-methoxy-N-methylthiolcarbamate | 2 | 0 |
|  | 8 | 0 |
| 2,4-dimethylphenyl N-methoxy-N-methylthiolcarbamate | 2 | 0 |
|  | 8 | 0 |

TABLE VIII.—SOYBEANS

| Test Chemical | Concn. | Injury Rating |
|---|---|---|
| p-Chlorophenyl N-methoxy-N-methylthiolcarbamate | 2 | 0 |
|  | 8 | 0 |
| p-Bromophenyl N-methoxy-N-methylthiolcarbamate | 2 | 0 |
|  | 8 | 0 |
| p-Methylphenyl N-methoxy-N-methylthiolcarbamate | 2 | 0 |
|  | 8 | 0 |
| m-Methylphenyl N-methoxy-N-methylthiolcarbamate | 2 | 0 |
|  | 8 | 0 |
| p-Chlorophenyl N-ethoxy-N-ethylthiolcarbamate | 2 | 1 |
|  | 8 | 0 |
| p-Bromophenyl N-ethoxy-N-ethylthiolcarbamate | 2 | 0 |
|  | 8 | 0 |
| 3,4-dichlorophenyl N-methoxy-N-methylthiolcarbamate | 2 | 0 |
|  | 8 | 0 |
| 2,4-dichlorophenyl N-methoxy-N-methylthiolcarbamate | 2 | 0 |
|  | 8 | 0 |
| 2,4-dimethylphenyl N-methoxy-N-methylthiolcarbamate | 2 | 0 |
|  | 8 | 0 |

TABLE IX.—WHEAT

| Test Chemical | Concn. | Injury Rating |
|---|---|---|
| p-Chlorophenyl N-methoxy-N-methylthiolcarbamate | 2 | 0 |
|  | 8 | 0 |
| p-Bromopheayl N-methoxy-N-methylthiolcarbamate | 2 | 0 |
|  | 8 | 2 |
| p-Methylphenyl N-methoxy-N-methylthiolcarbamate | 2 | 0 |
|  | 8 | 0 |
| o-Methylphenyl N-methoxy-N-methylthiolcarbamate | 2 | 0 |
|  | 8 | 0 |
| p-Chlorophenyl N-ethoxy-N-allylthiolcarbamate | 2 | 0 |
|  | 8 | 0 |
| p-Chlorophenyl N-ethoxy-N-ethylthiolcarbamate | 2 | 0 |
|  | 8 | 0 |
| p-Chlorophenyl N-isopropoxy-N-isopropyl-thiolcarbamate | 2 | 0 |
|  | 8 | 0 |
| p-Chlorophenyl N-ethoxy-N-ethylthiolcarbamate | 2 | 0 |
|  | 8 | 0 |
| p-Nitrophenyl N-methoxy-N-methylthiolcarbamate | 2 | 0 |
|  | 8 | 0 |
| 3,4-dichlorophenyl N-methoxy-N-methylthiolcarbamate | 2 | 0 |
|  | 8 | 0 |
| 2,4-dichlorophenyl N-methoxy-N-methylthiolcarbamate | 2 | 0 |
|  | 8 | 0 |
| 2,4-dimethylphenyl N-methoxy-N-methylthiolcarbamate | 2 | 0 |
|  | 8 | 0 |

Another particularly significant result of the herbicidal testing of the compounds of the present invention is the high degree of toxicity the compounds show to wild oats, for example p-chlorophenyl N-methoxy-N-methylthiolcarbamate at a concentration of 2 lbs. per acre gives an injury rating of 9 and at 8 lbs. per acre gives an injury rating of 10, and p-bromophenyl N-methoxy-N-methylthiolcarbamate at concentrations of 2 and 8 lbs. per acre also gives injury ratings of 9 and 10 respectively. These results are of great economic significance since wild oats is the major weed pest found in wheat fields and since these compounds have been shown to exhibit extraordinary selectivity for wheat, i.e. causing no injury at concentrations up to 8 lbs. per acre, these compounds can be used to control this weed without damaging the wheat crop.

The utility of the compounds of this invention was also illustrated by experiments conducted for the control of strawberry spider mites, *Tetranychus atlanticus*, by contact. The test compounds were formulated into wettable powder concentrates by adding to an inert carrier and grinding to a uniform blend. The respective formulations were dispersed in water to a concentration of .35 percent by weight of the actual test chemical per volume of water and applied by dipping lima bean plants infested with fifty to one hundred adult strawberry spider mites into the dispersed formulation. The plants were maintained under greenhouse conditions for 5 days, after which time, observations of mortality were made. In these experiments, the results were as follows:

TABLE X

| Concn.[1] | Test Chemical | Percent Mortality |
|---|---|---|
| .35 | p-Chlorophenyl N-methoxy-N-methylthiolcarbamate. | 100 |
| .35 | o-Methylphenyl N-methoxy-N-methylthiolcarbamate. | 82 |
| .35 | p-Methylphenyl N-methoxy-N-methylthiolcarbamate. | 76 |
| .35 | m-Methylphenyl N-methoxy-N-methylthiolcarbamate | 75 |
| .35 | p-Chlorophenyl N-ethoxy-N-ethylthiolcarbamate. | 76 |

[1] Percent by wt. of test chemical per volume of water.

We claim:
1. A compound of the formula

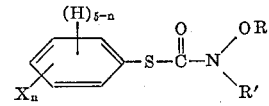

where R and R' are independently selected from the group consisting of lower alkyl, alkenyl, haloalkyl and nitroalkyl; X is selected from the group consisting of hydrogen, halogen, methyl and nitro radicals; $n$ is an integer from 0 to 2.

2. A compound of the formula

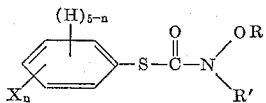

wherein R and R', each containing from 1 to 4 carbon atoms, are independently selected from the group consisting of lower alkyl, alkenyl, haloalkyl and nitroalkyl; X is selected from the group consisting of hydrogen, halogen, methyl and nitro radicals; $n$ is an integer from 0 to 2.

3. A compound of the formula

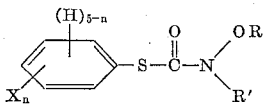

wherein R and R' are independently selected from the group consisting of lower alkyl radicals and X is selected from the group consisting of the halogen radicals; $n$ is an integer from 0 to 2.

4. p-Chlorophenyl N-methoxy-N-methylthiolcarbamate.
5. p-Bromophenyl N-methoxy-N-methylthiolcarbamate.
6. p-Methylphenyl N-methoxy-N-methylthiolcarbamate.
7. o-Methylphenyl N-methoxy-N-methylthiolcarbamate.
8. m-Methylphenyl N-methoxy-N-methylthiolcarbamate.
9. p-Chlorophenyl N-ethoxy-N-allylthiolcarbamate.
10. p-Chlorophenyl N-ethoxy-N-ethylthiolcarbamate.
11. p-Chlorophenyl N-isopropoxy-N-isopropylthiolcarbamate.
12. p-Bromophenyl N-ethoxy-N-ethylthiolcarbamate.
13. p-Nitrophenyl N-methoxy-N-methylthiolcarbamate.
14. p-Methylthiophenyl N-methoxy-N-methylthiolcarbamate.
15. p-Methoxyphenyl N-methoxy-N-methylthiolcarbamate.
16. p-Fluorophenyl N-methoxy-N-methylthiolcarbamate.
17. 2,5-dichlorophenyl N-methoxy-N-methylthiolcarbamate.
18. 2,5-dimethylphenyl N-methoxy-N-methylthiolcarbamate.
19. 3,4-dichlorophenyl N-methoxy-N-methylthiolcarbamate.
20. 2,4-dimethylphenyl N-methoxy-N-methylthiolcarbamate.
21. 2,4-dichlorophenyl N-methoxy-N-methylthiolcarbamate.

References Cited by the Examiner

UNITED STATES PATENTS

| | | | |
|---|---|---|---|
| 3,001,861 | 9/1961 | Fischer et al. | 71—2.6 |
| 3,012,870 | 12/1961 | Richter | 71—2.6 |
| 3,078,273 | 2/1963 | Harman et al. | 260—455 |
| 3,082,237 | 3/1963 | D'Amico | 260—455 |
| 3,098,001 | 7/1963 | Werres et al. | 260—455 X |

CHARLES B. PARKER, *Primary Examiner.*

J. O. THOMAS, *Assistant Examiner.*